P. J. FAY.
AUTOMOBILE HEADLIGHT.
APPLICATION FILED JULY 18, 1913.
1,101,912.
Patented June 30, 1914.
2 SHEETS—SHEET 1.
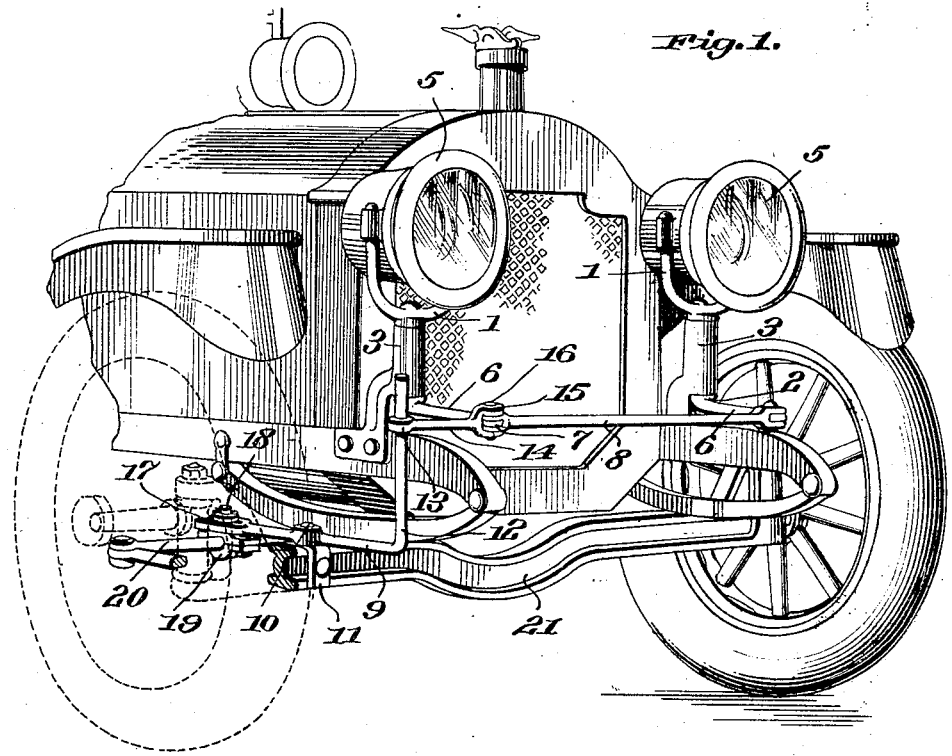
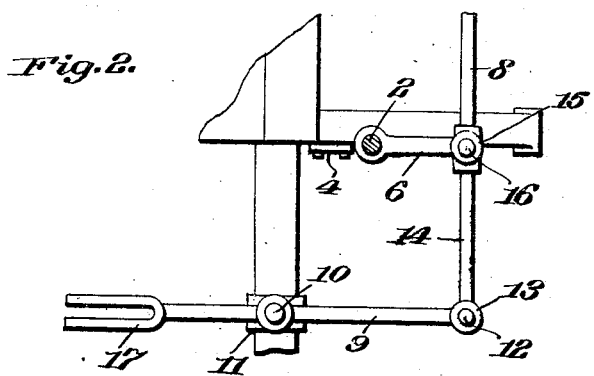

P. J. FAY.
AUTOMOBILE HEADLIGHT.
APPLICATION FILED JULY 18, 1913.
1,101,912.
Patented June 30, 1914.
2 SHEETS—SHEET 2.
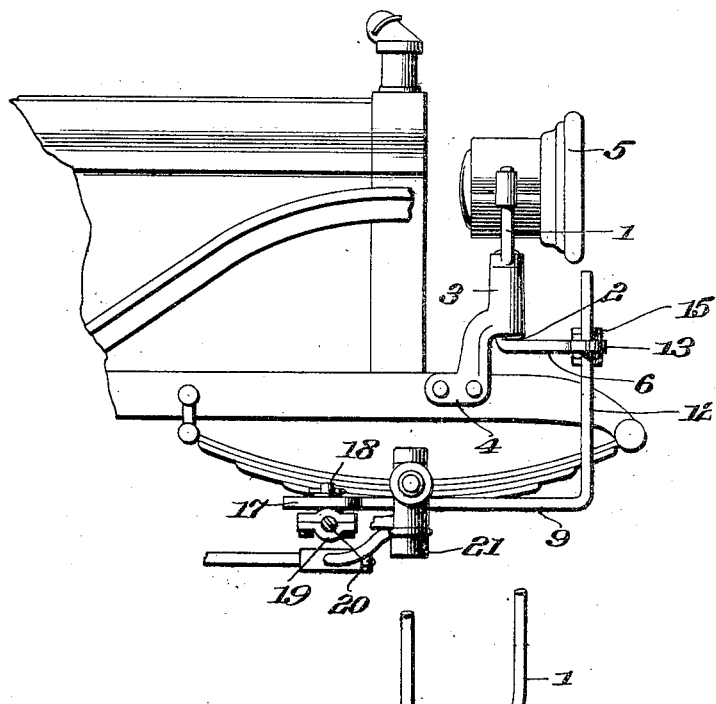
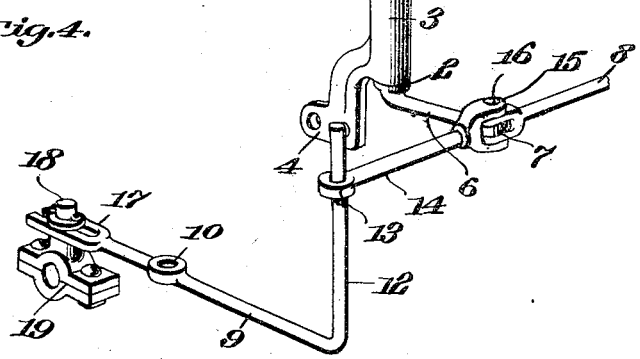
Inventor
P. J. Fay,
By Victor J. Evans
Attorney
Witnesses
Gerald Henry
V. B. Hillyard

UNITED STATES PATENT OFFICE.

PETER J. FAY, OF AUSTIN, TEXAS.

AUTOMOBILE-HEADLIGHT.

1,101,912.　　　　Specification of Letters Patent.　　Patented June 30, 1914.

Application filed July 18, 1913.　Serial No. 779,828.

*To all whom it may concern:*

Be it known that I, PETER J. FAY, a citizen of the United States, residing at Austin, in the county of Travis and State of Texas, have invented new and useful Improvements in Automobile-Headlights, of which the following is a specification.

The invention has relation to vehicle headlights and more particularly to the side lamps of automobiles and analogous mechanically propelled vehicles, the purpose being to mount such lamps in a manner to admit of their turning with the machine when rounding a curve or making a short turn, the purpose being to illuminate the roadway ahead of the machine, whether the latter is turning a corner, rounding a curve or traveling straight ahead so that the operator of such machine may observe the roadway for a safe distance in advance of the machine to avoid a casualty and at the same time enable a pedestrian, driver or operator of another machine or vehicle to avoid a collision.

The invention provides headlights which are mounted in a novel manner to turn about vertical axes and novel connecting means between such headlights and the steering mechanism to cause the steering wheels and headlights to turn in unison and about at the same angle to insure ample illumination of the roadway in advance of the machine to prevent accident of any nature.

The invention consists of the novel features, details of construction and combination of parts, which hereinafter will be more particularly set forth, illustrated in the accompanying drawings, and pointed out in the appended claims.

Referring to the drawings,

Figure 1 is a perspective view of the front portion of an automobile provided with dirigible headlights embodying the invention. Fig. 2 is a horizontal section. Fig. 3 is a side view, showing more clearly the connecting means. Fig. 4 is a perspective view of a lamp support, bracket and connecting means between the steering mechanism and such lamp support.

Corresponding and like parts are referred to in the following description, and indicated in all the views of the drawings, by the same reference characters.

The invention is designed for all makes of machines of the automobile type and contemplates such minor changes as are necessary to adapt the invention to the special construction of the several makes of machines. The lamp support comprises a fork 1 and stem 2, the latter being mounted in a bracket which is attached to the frame of the machine, said bracket comprising a vertical sleeve 3 and attaching plate 4, the latter being apertured to receive the fastening means employed for securing the bracket to the machine frame. The lamp 5 supported by means of the fork 1 may be of any make or design, such as generally employed as a headlight for automobiles and like machines. An arm 6 projects from the stem 2 and has an eye 7 at its outer end. A rod 8 connects the arms 6 of the side lamps to cause both to move in unison.

A lever 9 is fulcrumed intermediate of its ends upon a pin 10 extending vertically from a clamp 11, which is secured to the axle near one end thereof. A standard 12 projects vertically from one end of the lever 9 and passes through an eye 13 at one end of a link 14, the opposite end of such link being provided with spaced eyes 15 between which the eye 7 is received, a pin 16 connecting the parts 6 and 14 by passing through the registering eyes thereof. This construction holds the link 14 in an approximate horizontal position and admits of the standard 12 having a limited vertical movement in the eye 13. The rear end of the lever 9 has a fork 17, which receives a pin 18 projecting vertically from a clamp 19 secured to the drag link or connecting rod 20, which forms a tie between the arms of the steering knuckles to cause both to move in unison. When the steering wheels are moved the drag link or connecting bar 20 moves longitudinally and toward or away from the axle 21 and to compensate for such movement the pin 18 has ample play in the fork 17 and at the same time causes a turning of the lever 9 upon the pin 10, movement being transmitted from the lever 9 to the stem 2 of the lamp support by means of the intermediate connections 6, 14 and 12. The relative proportions are such as to cause the lamp to turn and occupy an angle corresponding with that of the steering wheels to insure throwing the light ahead of the machine when turning a corner, rounding a curve or traveling straight ahead. The vertical play of the standard 12 in the eye 13 of the link 14 provides for the action of the vehicle springs, thereby preventing binding or disabling of the intermediate connecting means between the parts.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In a headlight for mechanically propelled vehicles, the combination of side lamps, arms projecting from the lamp supports, a rod connecting such arms to cause the lamps to move in unison, a lever mounted between its ends upon the axle, connecting means between one end of such lever and the drag link connecting the arms of the steering knuckles, said connection being of a nature to compensate for the variation of distance between the drag link and axle when supporting the steering wheels, a standard at the opposite end of such lever and a link having one end pivotally connected with the rod forming connecting means between the arms of the lamp supports, such link having an eye at its opposite end to receive the standard of the beforementioned lever.

2. In a headlight for mechanically propelled vehicles, the combination of side lamps, supports therefor having off-standing arms, a rod connecting such arms, a link having a vertical eye at one end and provided at its opposite end with spaced eyes to embrace the joint between the adjacent lamp support arm and rod and receive the pivot fastening thereof, a lever mounted upon the axle and provided at one end with a standard which passes through the eye of the link, said lever having a fork at its opposite end, and a clamp mounted upon the drag link connecting the arms of the steering knuckles and provided with a pin to operate in the fork of the before mentioned lever.

In testimony whereof I affix my signature in presence of two witnesses.

PETER J. FAY.

Witnesses:
J. M. MOORE,
C. P. MOORE.

---

Copies of this patent may be obtained for five cents each, by addressing the "Commissioner of Patents, Washington, D. C."